United States Patent

[11] 3,537,620

[72] Inventor Kurt Artmann
Liebenstrasse 48, Vienna, Austria
[21] Appl. No. 745,444
[22] Filed July 17, 1968
[45] Patented Nov. 3, 1970
[32] Priority July 18, 1967, Dec. 27, 1967, April 29, 1968
[33] Austria
[31] A 6,699/67, A 11,654/67 and A 4,143/68

[54] METERING AND DISPENSING DEVICE FOR LIQUIDS
42 Claims, 8 Drawing Figs.
[52] U.S. Cl. .................................................. 222/335, 222/340
[51] Int. Cl. ................................................... G01f 11/06
[50] Field of Search ..................................... 222/335, (Consulted Mr. H. Lane) 340

[56] References Cited
UNITED STATES PATENTS
1,401,642  12/1921  Ravaz et al. .................. 222/335
2,814,422  11/1957  Mercier ......................... 222/335

Primary Examiner—Stanley H. Tollberg
Attorney—Ernest G. Montague

ABSTRACT: A metering system for fluids under pressure, in particular carbon dioxide pressure, which comprises a housing having inlet means and discharge means. A control piston is disposed and guided in the housing and the inlet means include an inlet valve. The discharge means include a discharge socket and a metering chamber includes a metering system and has a wall. The housing defines a bore which connects the housing with the metering chamber. The metering system comprises a spring biassing said piston which reciprocates in the metering chamber. The control piston opens and closes alternately the discharge means and simultaneously closes and opens the inlet means and defines a recess. A bolt is axially movable in the metering chamber, and the bolt engages in the recess of the control piston, only upon filling the metering chamber.

Fig. 2
Fig. 3
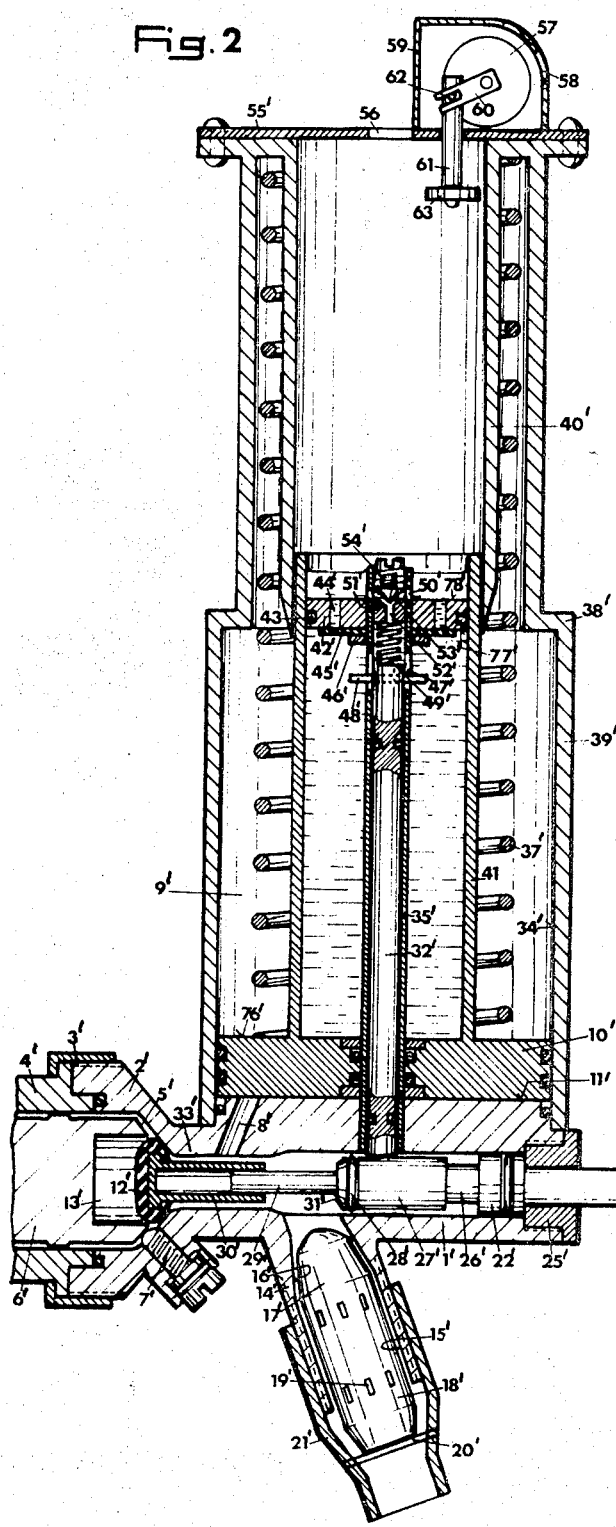
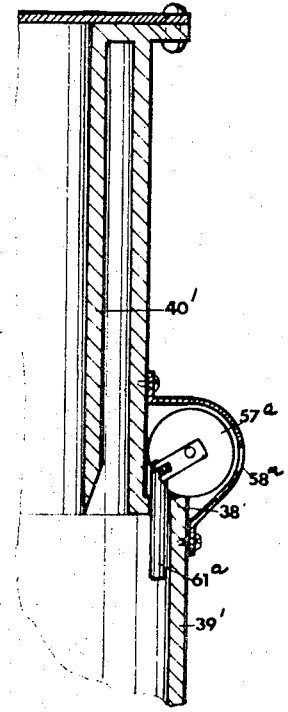

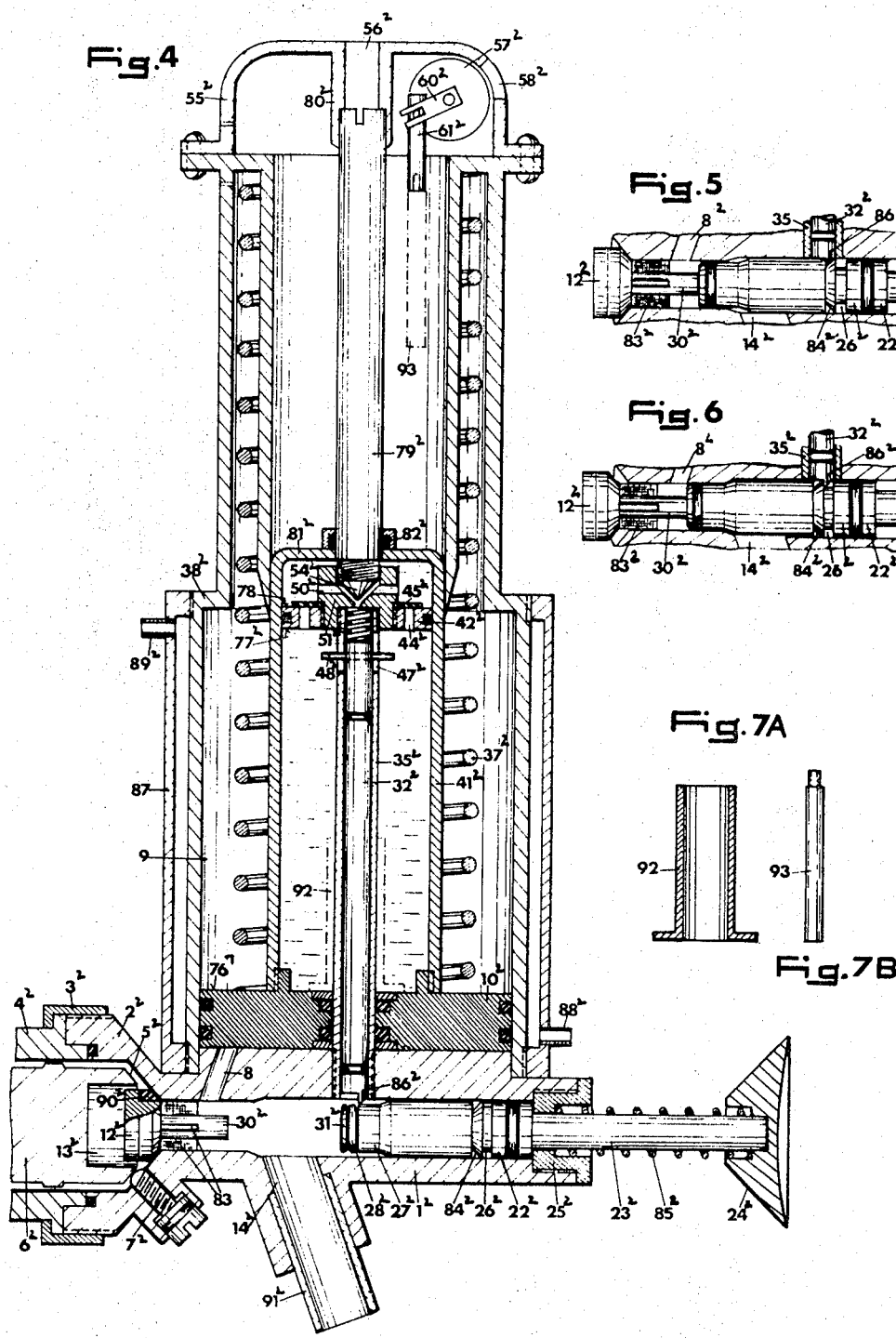

METERING AND DISPENSING DEVICE FOR LIQUIDS

The present invention relates to a metering and dispensing device, in general, and to a metering system for fluids which are pressurized, in particular. The invention relates especially to a metering system for fluids under pressurized carbon dioxide, particularly beverages such as lemonades and beer.

One of the objects of the present invention is to provide a metering system for a pressurized fluid, where such metering system can be conveniently connected to the outlet of a vessel containing the fluid and where such system is adapted to dispense a specified volume of such fluid by means of a pulse transmitted manually or in some other manner, to automatically count this procedure and to repeat the procedure any desired number of times.

It is a further object of the present invention to provide a metering system, which, when operated, will dispense a constant volume of a substantially frothy liquid under a relatively large pressure of carbon dioxide, a predetermined and always uniform quantity of a very finely bubbled and relatively stable froth being produced.

It is yet a further object of the present invention to provide a metering system which dispenses a predeterminable and always uniform volume of a frothy fluid.

It is still a further object of the present invention to provide a metering system comprising means which prevent the delivery of a quantity of fluid without being accompanied by a counting operation.

It is also a further object of the present invention to provide a metering system in which the metering system, in which the metering procedure and the dispensing of fluid takes place under conditions of cooling.

In general terms, the apparatus according to the present invention, comprises control means being connected on one side with an operating element and on the other side via connecting means, the fluid to be metered is disposed. The aforementioned control means are associated with a metering system which is conveniently disposed above the control means and comprise a metering piston adapted to limit in a metering chamber that volume which is delivered when the apparatus according to the present invention is operated. The metering piston which is displaced upwardly for the purpose of filling the metering chamber and which is displaced downwardly for the purpose of emptying the metering chamber may be biased during these movements by a braking system. On reaching its highest position in the metering chamber, the piston operates a counting mechanism whose position is indicated at all times. Finally, the control means are also associated with discharge means for the fluid, which passes through the metering chamber and flows through the control means and leaves the apparatus according to the present invention through the aforementioned discharge means.

According to the present invention therefore there is provided a device for dispensing a metered quantity of fluid, comprising a control member movable to a first fluid-releasing position, to permit fluid to be metered to flow into a metering chamber, locking means being provided to retain the operating member in the fluid-releasing position thereof during the flow of a predetermined quantity of fluid into the metering chamber, and means being provided operable, in response to the predetermined quantity of fluid having entered the metering chamber, to release the control member from the locking means to permit the control member to return to a second position in which further fluid is prevented from entering the metering chamber.

Preferably a piston is positioned in the chamber, the piston being biased towards a first stroke and position, the the arrangement being such that entry of fluid into the chamber causes the piston to yield against the biasing to move towards a second stroke end condition corresponding to the entry into the chamber of the predetermined quantity of fluid.

Conveniently the device is constructed such that, as the piston moves towards its second end position, the piston engages a projection on a rod of the locking means to move the rod out of locking engagement with the control member, as the piston reaches its second stroke end condition.

With these and other objects in view which will become apparent in the following detailed description, the present invention, given by example only, will be clearly understood in connection with the accompanying drawings, in which:

FIG. 2 is a longitudinal section of another embodiment of a metering device, particularly adapted for dispensing lemonades which are under a high carbon dioxide pressure in the region of 2 to 5 atm. gauge;

FIG. 3 is a fragmentary section of the counter unit of the embodiment disclosed in FIG. 2;

FIG. 4 is a longitudinal section of a further embodiment of a metering device adapted to meter not only all kinds of lemonades, but also substantially frothing beers with a high degree of accuracy, whereby each metering procedure is accompanied by the production of the same small amount of froth, while it is moreover possible to adjust the amount of froth to a desired value;

FIGS. 5 and 6 are elevations, partly in section, disclosing certain positions of a control piston, when the embodiment according to FIG. 4 is operated; and FIG. 7a is an axial section of a supporting element and FIG. 7b is an elevation of an extension rod, disclosing a system which serves to shorten the stroke of the metering piston.

Figure 1:
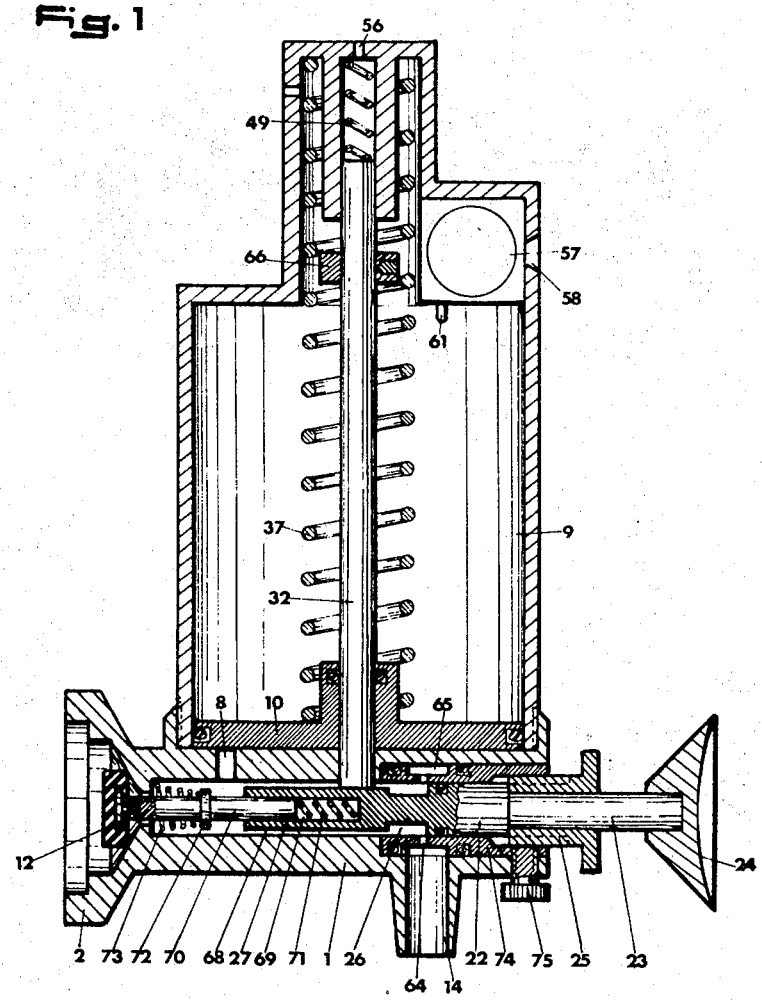
FIG. 1 is a longitudinal section of one embodiment of a metering device particularly adapted to meter lemonades, which are under a low carbon dioxide pressure of approximately 1-—2 atm. gauge.

Referring now to the drawings, and in particular to FIG. 1, a housing 1 of a control system is provided with a connecting duct 8 which provides communication between the control system and a metering chamber 9. A control member formed as a piston 22 operable by a pushbutton 24 is slidable in the housing 1, the control piston 22 having a peripheral stepped recess 26 and a hollowed end portion 27. Between the outer periphery of the end portion 27 and the inner wall of housing 1 there is defined an annular chamber 68. In the portion 27 the control piston 22 is provided with a bore 69, in which a shank 70 of an inlet valve 12 is guided and in which a compression spring 71 is supported.

The shank 70 is provided with a collar 72 which acts as abutment for a spring 73 adapted to assist the closing of an inlet valve 12.

A sleeve 74 is sealingly inserted into the housing 1 and is retained therein by a screw-threaded bolt 75 together with a retaining ring 25 for the control piston 22. The sleeve 74 has a ring of individual bores 64 disposed in a plane radial to the axis of sleeve 74 and functioning as discharge ports from the device, the bores 64 being mutually connected by an annular duct 65 formed by a recess in the sleeve 74, the duct 65 communicating with a discharge socket 14.

The recess 26 is so disposed that axial adjustment of the retaining ring 25 may cause the discharge bores 64 to be covered to a greater or lesser extent by the control piston 22, when the latter is in its static end position (FIG. 1), so that the discharge velocity of a previously metered quantity of fluid can be adjusted.

The housing 1 has disposed on it a metering chamber 9, adapted to receive liquid below a metering spring biased piston 10 slidable in the chamber and biased by a spring 37 towards a position in which the chamber is empty of fluid, the piston 10 and the spring 37 constituting a metering means.

A rod 32 biased by a spring 49 serves as a shaft for the piston 10 and is provided with an adjustable collar 66 securable thereon.

The embodiment of the metering device according to the present invention and illustrated in FIG. 1 operates in the following manner: If the pushbutton 24 is manually operated, the control piston 22 will move to the left, bear upon the collar 72 of the valve shank 70 and open the inlet valve 12 while at the same time closing the discharge port 64 and being retained in its position by the rod 32 which engages in the stepped recess 26 due to the effect of the spring 49.

The fluid which flows through the connecting system comprising the inlet valve 12 and a flange 2 raises the metering piston 12 in the metering chamber 9 against the action of the spring 37 until said metering piston entrains the collar 66 mounted on the rod 32 and thus also withdraws the rod 32 from the recess step 26 of the control piston 22. The metering chamber 9 will thus be filled with the amount of fluid to be metered. This amount may be selected and accurately predetermined by varying the position of the collar 66 on the rod 32 or in a manner which will be described subsequently in detail.

As soon as the bolt 32 is withdrawn from the recess step 26, the control piston 22 will slide back into its starting position to uncover the discharge port 64 and allow the inlet valve 12 to close. The fluid disposed in the metering chamber 9 is thus depressurized and discharged from the metering system by the metering piston 10 under the effect of the spring 37 to flow through the duct 8, the annular chamber 68, the stepped recess 26, the discharge ports 64, the duct 65 and the discharge socket 14.

In the embodiment according to FIG. 2 a housing 1 is sealingly connected by connecting means comprising a screw-threaded flange 2' and a union nut 3', to a pressure-reducing valve 4' of a storage vessel (not shown) for the pressurized fluid, a sealing surface 5 of a valve member of the pressure-reducing valve 4' being maintained in a desired open position by means of the screw-threaded bolt 7'.

The control system is connected via the communicating bore 8' to the metering chamber 9' which, as is shown in FIG. 1 in the completely empty position, with the piston 10' in its static end position in abutment with the floor surface 11' of the metering chamber 9'.

The housing 1' is provided with an inlet valve 12 which, upon opening, is movable in a bore 13 of the valve member of the pressure-reducing valve.

The housing 1' is further provided with a discharge socket 14' whose internal wall 15' has a tapered part 16' whose taper angle corresponds to that of the top end 17' of a bulb-shaped valve member 18' which is guided by means of spacers 19 in the discharge socket 14'. The valve body 18' bears on a retaining rod 20' of a screw-threaded coupler 21' which may be screwed as required upon the discharge socket 14', so that with its aid it is possible for the discharge velocity of the fluid to be regulated in any desired manner.

The housing 1' also contains a control piston 22' whose operating rod 23' is provided with a pushbutton 24' and which is guided in a retaining ring 25'; screwed into the housing 1'. The control piston 22' has a stepped recess 26' adjoined in the direction towards the inlet valve 12' first by a reduced diameter section 27' which is provided with a ring seal 28' and then by a guide rod 29 which is adapted to slide in a valve shank 30' of the inlet valve 12', to which end said valve shank 30 is constructed as a bush.

The section 27' of the control piston 22' is provided at the position merging into the guide rod 29' with a shoulder 31', which, when the pushbutton 24' is operated, bears against the valve shank 30' of the inlet valve 12' before a rod 32', to be explained subsequently, engages in the stepped recess 26' of the control piston 22.

A portion 33' of housing 1' is of reduced diameter relative to the inlet valve 12', and the connecting bore 8', which extends to the metering chamber 9', is disposed in this reduced diameter section 33' of housing 1'. The diameter of section 33' is such that the ring seal 28' of the reduced section 27' of the control piston 22' is adapted to seal the section 33' upon entering the same when the pushbutton 24' is operated.

The metering piston 10' is slidable on the cylindrical internal surface 34' of the metering chamber 9' and on the external surface of a guide tube 35' for the rod 32' mentioned hereinabove. The metering piston 10' is biased on its upper surface 76 with a compression spring 37' which is inserted in an annular guide slot disposed above a shoulder 38' of a wall 39' of the metering chamber 9 and formed between the wall 39' and an open cylinder 40'. A hydraulic cylinder 41, permanently joined to the metering piston 10' or constructed integrally therewith, is guided telescopically in the tube or cylinder 40'.

The previously mentioned guide tube 35' is centrally disposed in the aforementioned inner cylinder 41' which is filled with a braking or damping fluid, preferably water. A braking or damping piston 42, whose ring seal 43' is sealed relative to the inner cylinder 41', is screwed upon the aforementioned guide tube. The braking or damping piston 42' is provided with bores 44, covered with a plate 45' of resilient material, for example rubber, the plate 45' being flush mounted by means of a retaining disc 46' on the brake piston 42' on its surface 77 which faces the metering piston 10'. The bores 44' are filled with braking or damping fluid.

Above the rod 32', whose upper part is provided with a pin 48' which is guided in slots 47' and biased by a spring 49', a valve plate 51' is inserted in the zone between the aforementioned slots 47' and bores 50' into the guide tube 35', which is provided with a bore 52' and a tapered valve seat 53'. A valve member 54', which is screwed into the upper end of the guide tube 35' above the bores 50' and is adjustable, cooperates with the aforementioned valve plate 51'. A cover plate 55' above cylinder 40' has a central opening 56' for the purpose of adjustment of the valve member.

In the embodiment illustrated in FIG. 2, the cover 55' has disposed on it a counting system 57 which can be observed through a window 58 in a counting mechanism housing 59. A bifurcated arm 60 of the counting mechanism 57 is operated in the illustrated case by the cylinder 41 as it rises via a tapped 61, which is provided with a pin 62 and a flat disc 63 at its lower end, operation taking place as soon as the metering piston 10' is in the zone of its highest position.

Alternatively, the counting system 57a may instead be disposed in the zone of the shoulder 38' of the wall 39' of the metering chamber 9', as illustrated in FIG. 3. In this case, the tappet 61 is directly raised by the metering piston 10' and the counting mechanism is operated in this manner.

The system according to the present invention is operated by actuating the pushbutton 24'. This causes the control piston 22' to be advanced in the housing 1' and the reduced section 27' with the seal 28' mounted in front is urged into the reduced section 33' of the housing 1' to seal the chamber between the inlet valve 12' and the connecting bore 8' on the one hand and the discharge socket 14' on the other hand.

Thereupon the shoulder 31' bears against the end of the valve shank 30' while continued thrust motion causes the inlet valve 12' to open until the control piston is so far advanced that the rod 32' engages in the stepped recess 26' to prevent further forward motion of the control piston.

In this position the rod 32' also prevents reverse motion of the control piston under the action of the fluid pressure.

The fluid will then penetrate through the connecting bore 8' into the metering chamber to raise the metering piston. The raising motion may take place slowly if, as illustrated in FIG. 2, braking or damping means are provided, which ensure that the upward motion of the metering piston is not sudden but starts gradually and is slowly continued against the action exerted by the compression spring 37'. This is achieved, upon raising of the piston 10', by the delivery of braking or damping fluid through the slots 47', through the narrow bore 52' of the valve plate 51', via the valve seat along the valve member 54' and through the bores 50' into the space above the brake piston 42'. The delivery rate can be adjusted by appropriate rotation of the valve member 54'.

Expansion of the carbon dioxide in the metering chamber 9' and consequent foaming of the fluid in this zone of the system can thus be avoided.

Before the upward-moving metering piston 10' reaches the pin 48' the cylinder 41' will push the disc 63 or the tappet 61 of the counting system 57 in the upward direction and thus operate the counting mechanism.

As soon as the metering piston $10'$ reaches the pin $48'$ of the rod $32'$, the latter rod will be raised by the metering piston. This action is also accompanied by withdrawal of the rod $32'$ from the stepped recess $26'$ and the control piston $22'$ thus released jumps back into its starting position. At the same time the inlet valve $12'$ closes under the effect of the pressure exerted by the fluid in the storage vessel. The thrust exerted by the spring $37'$ causes the metering piston $10'$ to be pushed downwardly and fluid is discharged from the system via the metering chamber $9'$, the connecting bore $8'$, the housing $1'$, the discharge socket $14'$ and the coupler $21'$. The downward moving metering piston $10'$ draws damping fluid through the bores $44'$ past the resiliently yielding washer $45'$ into the space disposed below the braking piston $42'$.

The exit velocity of the fluid containing carbon dioxide and being discharged through the discharge socket $14'$ is adjusted in the desired manner by suitable selection of the screw-threaded coupler $21'$ to prevent foaming while the fluid passes through the housing $1'$ of the control system and through the discharge means.

In general terms, the embodiment illustrated in FIG. 2 has three distinctive main parts, namely a control system, a metering system and a special discharge system and it was found that the desired, substantially foam-free metering of fluid can be achieved only by the cooperation of all three systems.

FIG. 4 of the drawing shows a further embodiment in which, as in the embodiment illustrated in FIG. 2, the housing 2 of the control system is connected to a pressure-reducing valve of a storage vessel (not shown) for pressurized fluid by connecting means comprising a screw-threaded flange $2^2$, an inlet valve $12^2$ and a union nut $3^2$. The valve member $6^2$ of the pressure-reducing valve $4^2$ is provided with a bore $13^2$ which permits movement of the inlet valve $12^2$ when said valve is opened and closed. The sealing surface $5^2$ of the valve member $6^2$ is maintained in the desired open position by means of a screw-threaded bolt $7^2$.

The control system comprises the housing $1^2$ and the control piston $22^2$.

The housing $1^2$ contains a connecting duct $8^2$ which connects the control system with the metering system which will be described subsequently. Further, the housing $1^2$ also has a branch for a discharge socket $14^2$ in which a discharge tube $91^2$ is inserted which may, if desired, be replaced by a longer or shorter discharge tube. A guide tube $35^2$ which guides a rod $32^2$ and a metering piston $10^2$, is permanently inserted into the housing $1^2$. A retaining ring $25^2$, in which an operating rod $23^2$ of the control piston $22^2$ is guided and which receives one end of a compression spring $85^2$, is inserted into the housing $1^2$ opposite to the inlet valve $12^2$.

The control piston $22^2$, which is slidable in the housing $1^2$, is provided in its frontal, reduced section $27^2$ with a ring seal $28^2$, and in this embodiment, terminates with a shoulder $31^2$, which, when the control piston $22^2$ is operated, bears on the shank $30^2$ of the inlet valve $12^2$ in a manner similar to that of the embodiment illustrated in FIG. 2. The control piston $22^2$ also has two recesses $26^2$ and $84^2$ disposed at a certain distance from the shoulder $31^2$ and adapted to cooperate with the rod $32^2$ as will be described hereinbelow. The control piston $22^2$ is also provided with the previously mentioned operating rod $23^2$ at whose end the pushbutton $24^2$ is positioned and in which the compression spring $85^2$ is disposed.

It must be stressed that the first recess $26^2$ must be provided in the control piston $22^2$ if a rod $32^2$ is employed for retaining said control piston in its frontal position. In a preferred embodiment the recess $26^2$ is of square or rectangular cross section as indicated by the example of FIGS. 1, 2 and 4.

On the other hand, it is not essential to provide the second recess $84^2$ which is disposed on the control piston $22^2$ immediately upstream of the first recess $26^2$ and which has a triangular cross section of a shape corresponding to the cross-sectional shape of the lower end of the rod $32^2$ (FIG. 4).

The lower end of the bolt $32^2$ may be constructed as a tooth $86^2$ in accordance with FIG. 4, but also as a wedge which is symmetrical or nonsymmetrical relative to the longitudinal axis of the bolt $32^2$ or may be constructed in some other manner. The essential feature is merely, that it must have a sliding cam surface to enable it to be pushed upwardly in the guide tube $35^2$, when the control piston $22^2$ is operated, in order to engage immediately thereafter in the recess $26^2$ from which it can be withdrawn solely by virtue of the metering piston $10^2$ raising the pin $48^2$ in the upper part of the bolt $32^2$ and therefore raising the bolt $32^2$ itself in the guide tube $35^2$.

As can be seen by comparing FIGS. 2 and 4, the movement of the piston $10^2$ in the metering chamber $9^2$ is also hydraulically damped in the embodiment of FIG. 4.

To this end, the inner cylinder $41^2$ in the embodiment according to FIG. 4 is closed by a cover $81^2$ into which a seal $82^2$ is inserted. The braking or damping system, comprising the damping piston $42^2$ and valves associated therewith and adapted to slide in the inner cylinder $41^2$, is completely disposed within the inner cylinder $41^2$. In the same way as in the embodiment illustrated in FIG. 2, the braking or damping piston $42^2$ of the embodiment according to FIG. 4 is also provided with bores $44^2$ which are covered with a valve flap or plate $45^2$ of resilient material, but by contrast to the arrangement of FIG. 2, the plate bears on the surface $78^2$ of the braking piston $42^2$ which faces away from the metering piston $10^2$. The nonreturn valve formed by the bores $44^2$ and the plate $45^2$ is conveniently constructed to have a larger free cross section than the needle valve comprising the valve plate $51^2$ and the valve member $54^2$, as can be recognized in FIGS. 2 and 4.

The needle valve is disposed in the middle of the nonreturn valve and its valve plate $51^2$ may close the end of the guide tube $35^2$ according to FIG. 4 and may be constructed integrally with the holder of the valve member $54^2$ in which holder the bores $50^2$ are disposed. Alternatively, the valve plate $51^2$ may also be constructed integrally with the braking or damping piston $42^2$.

In order to obtain adjustability of the needle valve more conveniently than possible in the embodiment according to FIG. 2, it is possible according to FIG. 4 for the needle or cone-shaped valve member $54^2$ to be provided with a shank $79^2$ which extends through the seal $82^2$ of the cover $81^2$ and is guided in a guide sleeve $80^2$ of the cover $55^2$ of the cylinder $40^2$.

The inner cylinder $41^2$ is filled with braking or damping fluid, preferably with water, as far as its cover $81^2$ and it will be evident that the metering piston $10^2$ is only slightly damped during its upward movement because the braking or damping fluid passes without substantial resistance through the bores $44^2$ of the braking or damping piston $42^2$ while raising the plate $45^2$ of resilient material. By contrast the metering piston $10^2$ is substantially damped during its downward movement in a manner similar to the damping arrangement of FIG. 2.

A counting system $57^2$ may be conveniently accommodated in the cover $55^2$ which system may be viewed through the window $58^2$.

In metering certain beverages such as beer, it may be advantageous to employ cooling and to this end the system according to the present invention may be provided with a cooling jacket $87^2$ which surrounds the metering chamber $9^2$ and is connected via sockets $88^2$, $89^2$ to a cooling medium circuit.

As illustrated in FIG. 5, when the pushbutton $24^2$ is operated the tooth $86^2$ of the bolt $32^2$ engages in the recess $84^2$ of the bolt $32^2$ engages in the recess $84^2$ of the control piston $22^2$ while the shoulder $31^2$ of the control piston $20^2$ is so spaced from the engaged bolt that it merely touches the shank $30^2$ of the inlet valve $12^2$ with the frontal ring seal $28^2$ of the control piston $22^2$ sealingly disposed in the frontal reduced section $33^2$ of the housing $1^2$ of the control system. The inlet valve $12^2$ is therefore not yet opened in this position of the control piston, while at the same time the discharge socket $14^2$ is closed by the control piston $22^2$.

For reasons which will be explained hereinafter, it is essential that no manner of manipulation of the operating button $24^2$ causes the control piston $22^2$ to be returned from this position into its starting position and that, as already mentioned earlier, the pin 48[2] and therefore the bolt 32[2] must be raised by the metering piston 10[2] as far as the circumference of the control piston 22[2] to enable said control piston to return to its starting position. It is this feature which protects the metering system according to the invention against removal of the fluid therefrom without operation of the counting mechanism. This feature of the present invention will become clearer and more easily understandable by consideration of the same operating phase in the embodiment according to FIG. 1, which is not provided with such a recess 84[2].

In the embodiment of FIG. 1, by depressing the button 24, the control piston 22 may be displaced in the housing 1 against the inlet valve 12 in this case (FIG. 1) as already described. In the course of this movement the piston 22 closes (as in the embodiment of FIG. 4) first the discharge port 64 and the discharge socket 14 and only then opens the inlet valve 12. It is possible to depress the button 24 very carefully towards the end of the forward motion of the control piston 22 in the housing 1, so that the valve 12 opens only slightly without the bolt 32 engaging in the recess 26. If the pushbutton 24 is retained in this position, the metering chamber 9 will fill slowly while the metering piston 10 is raised until the metering piston begins to raise the tappet 61 of the counting mechanism 57. This procedure can be recognized by virtue of one of the numerals in the window 58 beginning to move.

If the button 24 is released at that moment, the aforementioned numeral will immediately return into its starting position without any counting taking place because the control piston 22 which is not obstructed by the bolt 32 which has not yet engaged in the recess 26, immediately returns into its starting position owing to the pressure exerted by the fluid, so that first the inlet valve 12 closes and subsequently the discharge port 64 and the discharge socket 14 opens whereupon the fluid flows from the metering chamber 9 under the effect of the thrust exerted by the spring 37 and is discharged through the discharge socket 14. In this case fluid will have been dispensed without such procedure having been counted by the counting system.

Dispensing of fluid without a counting operation in the manner described hereinabove is not possible in the embodiment illustrated in FIG. 4. In this case, the bolt 32[2] engages, as already mentioned, in the recess 84[2] before the inlet valve 12[2] is opened by the shoulder 31[2] of the control piston 22[2] while at the same time the discharge socket 14[2] is already closed by the control piston 22[2]. It may still be possible by careful depression of the button 24[2] to fill the metering chamber 9[2] until the above-mentioned reaction is indicated by the appearance of a numeral of the counting mechanism 57[2] in the window 58[2]. However, it is no longer possible to empty the metering chamber without at the same time executing a full counting operation in the counting mechanism 57[2]. This is due to the fact that reverse motion of the control piston 22[2] is blocked by the tooth 86[2] of the bolt 32[2] which is engaged in the recess 84[2]. When the button 24[2] is operated, the tooth 86[2] can be withdrawn from the recess 84[2] only if the control piston 22[2] is pushed further into the housing 1[2]. However, this causes the tooth 86[2] to drop into the recess 26[2] according to FIG. 6 from which it is withdrawn automatically and while fully operating the counting mechanism as soon as the metering piston 10[2] raises the pin 48[2] under the effect of the pressure of the fluid which flows through the inlet valve 12[2] and the connecting bore 8[2] into the metering chamber 10[2].

According to a further embodiment the apparatus according to the present invention may also be so constructed, that by its means it is possible to meter liquid volumes of different magnitude. As an example, it may be required to dispense beer in quantities of 500 ml., 300 ml. or 200 ml. FIG. 7 illustrates a tubular supporting element 92, which may be so inserted into the metering system according to the present invention, as indicated by the dot-dash lines of FIG. 4. FIG. 7 also shows an extension rod 93 which is screwed onto the tappet 61[2] of the counting mechanism 57[2] and which has exactly the same length as the supporting element 92.

The length of the supporting element 92 limits the stroke of the metering piston because when such a supporting element 92 is employed, its upper edge strikes the pin 48[2] of the bolt 32[2] and, since the extension rod 93 has the same length as the supporting element 92, the counting process in the counting system 57[2] is triggered through the cover 81[2] of the inner cylinder 41[2] via the aforementioned extension rod 93 and the tappet 61[2].

It will be clear that such a metering system can optionally meter liquid volumes of different magnitude, to which end it is only necessary to provide for each specified liquid volume only one supporting element 92 and only one extension rod 93 of a certain length which have to be inserted into the system.

This embodiment is particularly important because it enables the individual manufactured metering systems to be calibrated by the insertion of a supporting element 92 which serves to correct the volume of the metering chamber, so that for example each one of the aforementioned metering systems is able to dispense precise amounts of 500 ml. of fluid.

It will be appreciated that the embodiments illustrated are merely illustrative, and could be varied in many ways. For example, advantageous features of one of the described embodiments could be included in any of the other embodiments.

I claim:

1. A metering system for fluids under pressure, in particular carbon dioxide pressure, comprising:
   a housing having inlet means and discharge means;
   a control piston disposed and guided in said housing;
   said inlet means including an inlet valve;
   said discharge means including a discharge socket;
   a metering chamber including a metering means and having a wall;
   said housing defining a bore connecting said housing with said metering chamber;
   said metering means comprising:
     a spring and a spring-biased piston;
     said spring biasing said spring-biased piston, reciprocating in said metering chamber;
   said control piston alternately opening and closing said discharge means and simultaneously closing and opening said inlet means and defining a recess;
   a bolt axially movable in said metering chamber; and
   said bolt engaging in said recess of said control piston, only upon filling said metering chamber.

2. The system, as set forth in claim 1, wherein said metering chamber is mounted on said housing.

3. The system, as set forth in claim 1, which includes:
   braking means comprising a hydraulic cylinder disposed in said metering chamber;
   said spring arranged in said metering chamber and surrounding said hydraulic cylinder;
   the latter is disposed on the surface of said spring-biased piston biased by said spring; and
   a stationary braking piston in said hydraulic cylinder.

4. The system, as set forth in claim 1, wherein said spring-biased piston bears substantially without a gap on the bottom of said metering chamber.

5. The system, as set forth in claim 1, wherein:
   said bolt constitutes a guide rod for said spring-biased piston in said metering chamber and has a collar adjustable along said bolt; and
   said spring-biased piston bears against said collar upon raising said bolt from said recess of said control piston after filling said metering chamber with fluid.

6. The system, as set forth in claim 1, wherein:
   said bolt constitutes a guide rod for said spring-biased piston in said metering chamber and has a crosswise disposed stop pin adjustable along said bolt; and
   said spring-biased piston bears against said crosswise disposed stop pin upon raising said bolt from said recess of said control piston after filling said metering chamber with fluid.

7. The system, as set forth in claim 6, which includes:
   a guide tube fixedly mounted in said housing; and said bolt slides axially in said guide tube.

8. The system, as set forth in claim 1, wherein said bolt is urged by said spring against said control piston and against said recess, respectively.

9. The system, as set forth in claim 3, which includes:
a second cylinder guiding said hydraulic cylinder; and
said second cylinder forming jointly with the outer wall of said metering chamber a guide box for said spring biasing said spring-biased piston.

10. The system, as set forth in claim 6, wherein said crosswise disposed stop pin is slidingly guided in two oppositely disposed slots of said guide tube.

11. The system, as set forth in claim 3, wherein said hydraulic cylinder disposed on said metering system is open at its upper end.

12. The system, as set forth in claim 11, which includes:
a needle valve having a valve lid;
a cover for said needle valve; and
a shank for said needle valve is guided through said cover.

13. The system, as set forth in claim 12, which includes:
a stationary braking piston;
said needle valve is centrally disposed in said stationary braking piston; and
at least one nonreturn valve has a free cross section which is larger than that of said needle valve, and is disposed eccentrically.

14. The system, as set forth in claim 13, wherein:
said braking piston has a plurality of bores; and
said nonreturn valve includes a circular valve plate of resilient material covering said plurality of bores and surrounding concentrically said centrally disposed needle valve.

15. The system, as set forth in claim 14, wherein said circular valve plate bears on the surface of said braking piston facing said metering piston.

16. The system, as set forth in claim 14, wherein said circular valve plate bears on the surface of said braking piston being remote from said metering piston.

17. The system, as set forth in claim 7, wherein:
said needle valve has a perforated valve plate above said guide slot for said stop pin of said bolt;
braking fluid disposed below said braking piston communicates through a bore of said perforated valve plate; and
a valve seat is disposed on the upper side of said perforated valve plate and cooperating with an adjustable cone-shaped valve lid.

18. The system, as set forth in claim 17, wherein:
said valve plate and said valve lid is disposed in said guide tube; and
the latter has at least one bore between said perforated valve plate and said valve lid.

19. The system, as set forth in claim 17, which includes:
holding means for said valve lid; and
said perforated valve plate closes the open end of said guide tube and is integral with said holding means for said lid and also with said braking piston.

20. The system, as set forth in claim 17, wherein:
said valve lid includes said shank;
said cover of said metering chamber, has a guide; and
said shank is guided in said guide.

21. The system, as set forth in claim 8, wherein said spring biasing said bolt is supported on said perforated valve plate.

22. The system, as set forth in claim 1, wherein said inlet valve together with said control piston are disposed coaxially in said housing.

23. The system, as set forth in claim 1, wherein:
said housing has a portion of reduced diameter relative to said inlet valve; and
said bore leading to said metering chamber extends from said portion of reduced diameter of said housing.

24. The system, as set forth in claim 23, wherein:
said control piston has a zone of reduced diameter receiving the end of said bolt in one of the positions of said control piston in which said control piston opens said inlet valve; and a ring seal is secured to said control piston and sliding with said control piston towards said portion of reduced diameter of said housing.

25. The system, as set forth in claim 24, wherein said ring seal stops in said portion of reduced diameter of said housing at a position upstream of said bore upon engagement of said bolt in said recess of said control piston.

26. The system, as set forth in claim 25, wherein said inlet valve has a valve shank, said control piston has a guide rod, and said valve shank comprises a bush receiving slidingly said guide rod.

27. The system, as set forth in claim 26, wherein:
said zone of reduced diameter of said control piston has a shoulder at the point of merging with said guide rod; and
said shoulder bears against said valve shank of said inlet valve before said bolt engages said recess in said control piston.

28. The system, as set forth in claim 27, wherein:
said control piston has a bore;
said shank of said inlet valve is guided in said bore; and
a spring disposed in said bore and urging said inlet valve into open position.

29. The system, as set forth in claim 27, wherein:
said shank of said inlet valve has a collar; and
an additional spring surrounding said shank and supported by said collar, thereby urging said inlet valve into closing position.

30. The system, as set forth in claim 29, which includes:
a sleeve sealingly inserted into said housing within the zone of said discharge socket;
said sleeve comprising a plurality of individual bores disposed in a radial plane of said sleeve; and
said sleeve includes an annular duct leading to said discharge socket.

31. The system, as set forth in claim 30, wherein:
said control piston has a second recess of triangular cross section upstream of said first mentioned recess;
the lower end of said bolt has a cross section complementary to that of said second recess; and
said second recess is disposed at a distance from said shoulder of said control piston, that upon engagement of said control piston by said bolt, said shoulder at most merely touches said shank of said inlet valve, which said ring seal of said control piston is already sealingly disposed in said reduced section of said housing.

32. The system, as set forth in claim 31, which includes guide strips disposed on said shank of said inlet valve within said reduced section of said housing.

33. The system, as set forth in claim 32, wherein:
said control piston includes an operating rod having a pushbotton at its free end; and
a retaining ring inserted into said housing and guiding said operating rod.

34. The system, as set forth in claim 33, which includes a spring disposed between said retaining ring and said pushbutton.

35. The system, as set forth in claim 34, which includes:
counting means;
a member disposed in said metering chamber and operatively connected with said counting mechanism; and
said member is moved during filling of said metering chamber to operate said counting means.

36. The system, as set forth in claim 35, which includes:
a cover having an opening for operation of said needle-shaped valve lid;
an additional housing secured to said cover;
said counting means is disposed in said additional housing;
said counting mechanism has a bifurcated arm; and
a tappet having a pin and pivoting said bifurcated arm.

37. The system, as set forth in claim 36, wherein:
said metering chamber has a wall including a shoulder;
said counting mechanism is disposed within the zone of smaller diameter of said wall; and
said tappet extends through said shoulder and is operated by said spring biased piston.

38. The system, as set forth in claim 37, which includes:
a longitudinal member inserted in said hydraulic cylinder concentrically about said guide tube, in order to selectively shorten the stroke of said metering piston; and
a rod secured to and extending said tappet for a length equal with that of said longitudinal member.

39. The system, as set forth in claim 38, which includes:
a bulb-shaped valve lid is disposed in said discharge socket and has a tapered front end;
the latter has an inner wall including a tapered part thereof; and
the distance from the tapered part of said inner wall is adjustable in the zone of said tapered front end of said valve lid.

40. The system, as set forth in claim 39, which includes a screw-threaded coupler having a retaining rod and screwed to said discharge socket, in order to adjust said bulb-shaped valve lid in said discharge socket.

41. The system, as set forth in claim 40, which includes:
a pressure-reducing valve having a valve lid disposed upstream of said inlet valve; and
a screw-threaded bolt is rotatable in a flange of said housing, in order to maintain said valve lid in an open position.

42. The system, as set forth in claim 1, which includes a cooling jacket surrounding said wall of said metering chamber.